(12) United States Patent
Rosengard (10) Patent No.: US 6,760,345 B1
(45) Date of Patent: Jul. 6, 2004

(54) COMPRESSING CELL HEADERS FOR DATA COMMUNICATION

(75) Inventor: Phillip I. Rosengard, Sterling, VA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/051,539

(22) Filed: Jan. 16, 2002

(51) Int. Cl.$^7$ .............................. H04J 3/24; H04L 12/56
(52) U.S. Cl. ........................ 370/477; 370/474; 370/389; 370/395.1; 370/412
(58) Field of Search ............................. 370/230.1, 310, 370/310.1, 312, 315, 316, 326, 345, 349, 389, 395.1, 421, 442, 470–477, 521, 905

(56) References Cited

U.S. PATENT DOCUMENTS

| | | | | |
|---|---|---|---|---|
| 5,664,116 A | * | 9/1997 | Gaytan et al. | 709/234 |
| 5,835,730 A | * | 11/1998 | Grossman et al. | 709/247 |
| 6,111,871 A | | 8/2000 | Chen et al. | 370/349 |
| 6,446,235 B1 | * | 9/2002 | Drottar et al. | 714/781 |
| 6,510,156 B1 | * | 1/2003 | Brock et al. | 370/395.1 |
| 6,535,526 B1 | * | 3/2003 | Oyamada et al. | 370/477 |
| 2002/0071432 A1 | * | 6/2002 | Soderberg et al. | 370/389 |
| 2003/0012209 A1 | | 1/2003 | Abedlilah et al. | 370/412 |

FOREIGN PATENT DOCUMENTS

| | | | | |
|---|---|---|---|---|
| WO | WO 99/04339 | * | 1/1999 | G06F/11/10 |
| WO | WO 99/04522 | * | 1/1999 | H04J/3/26 |

OTHER PUBLICATIONS

PCT Search Report for PCT/US03/00327, 6 pages, Apr. 21, 2003.
"New Satellite–Base ATM Services Announced by COMSAT World Systems," *COMSAT*, web page press release at http://www.eee.surrey.ac.uk/Personal/T.Ors/atmast/comsat1.txt, Apr. 2, 1996 2 pages, Jan. 16, 2002.
*ATM New Digest*, vol. 5, No. 129, Jul. 9, 1998, web page at http://www.atmdigest.com/archieve/v5n129.txt, 3 pages, Jan. 16, 2002.
"cla–2000/atm," *Lockheed Martin Global Telecommunications*, web page at http://www.1mgt.com/servlet/ProductServiceDetail?SiteContentID=125, Jan. 16, 2002.

* cited by examiner

*Primary Examiner*—Hassan Kizou
*Assistant Examiner*—Ahmed Ellallam
(74) *Attorney, Agent, or Firm*—Baker Botts L.L.P.

(57) ABSTRACT

Cell header compression is disclosed. Cells are received. A cell includes a cell header and a payload. The cells are sorted according to the cell headers. A compression control block is generated that describes the cell headers and an arrangement of the payloads according to the cell headers. The payloads are assembled according to the arrangement. A datagram is generated with the compression control block and the assembled payloads.

40 Claims, 5 Drawing Sheets

COMPRESSING CELL HEADERS FOR DATA COMMUNICATION

GOVERNMENT FUNDING

The U.S. Government may have certain rights in this invention as provided for by the terms of Grant No. F04701-97-C-0044 awarded by Electronic Systems Division/Air Force Material Command (ESD/AFMC).

TECHNICAL FIELD OF THE INVENTION

This invention relates in general to the field of data communications and, in particular, to compressing cell headers for data communication.

BACKGROUND OF THE INVENTION

As communication needs increase, data communication technology has become more important. One deficiency associated with known data communications systems is the inefficiency of transmitting information over satellite broadcast systems. As technology has progressed, the computational costs of encapsulating data for satellite transmission have been significantly reduced, but satellite communication costs, which are measured as dollars per bit, have not. Consequently, known data communications technologies are not satisfactory for many uses.

SUMMARY OF THE INVENTION

In accordance with the present invention, disadvantages and problems associated with data communication techniques are reduced or eliminated.

According to one example of the present invention, a method of cell header compression is disclosed. A plurality of cells are received. A cell includes a cell header and a payload. The cells are sorted according to the cell headers. A compression control block is generated that describes the cell headers and an arrangement of the payloads according to the cell headers. The payloads are assembled according to the arrangement. A datagram is generated with the compression control block and the assembled payloads.

Certain examples of the invention may provide one or more technical advantages. A technical advantage of one example may be that cell headers are compressed, which may increase the efficiency of satellite communication. Compression of cell headers may improve the efficiency of satellite communication by decreasing the amount of data transmitted over the satellite. Another technical advantage of an example may be that cell header compression is compliant with the Digital Video Broadcast (DVB) standard and, thus, compliant with existing DVB hardware. Another technical advantage of an example may be that asymmetrical compression processing is utilized, which may reduce computational workload for the receiver. The bulk of the computational workload may be performed by the transmitter instead of the receiver. A benefit may be that receivers can include small computers with a smaller physical volume and weight. Another technical advantage of one example is that the transmitter workload may be reduced by avoiding unnecessary transitions between compression procedures. The example system may attempt to remain in a state where a particular compression procedure has proven previously successful for compressing cell headers.

Another technical advantage provided by an example may be that cell headers of encrypted data may be compressed. High speed encrypters may be used to encrypt cells, but must leave the cell header intact. Because there may be no benefit to compressing the encrypted payload, a means to improve transmission efficiency may be by compressing the cell headers.

Other technical advantages may be readily apparent to one skilled in the art from the figures, descriptions and claims included herein. None, some, or all of the examples may provide technical advantages.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
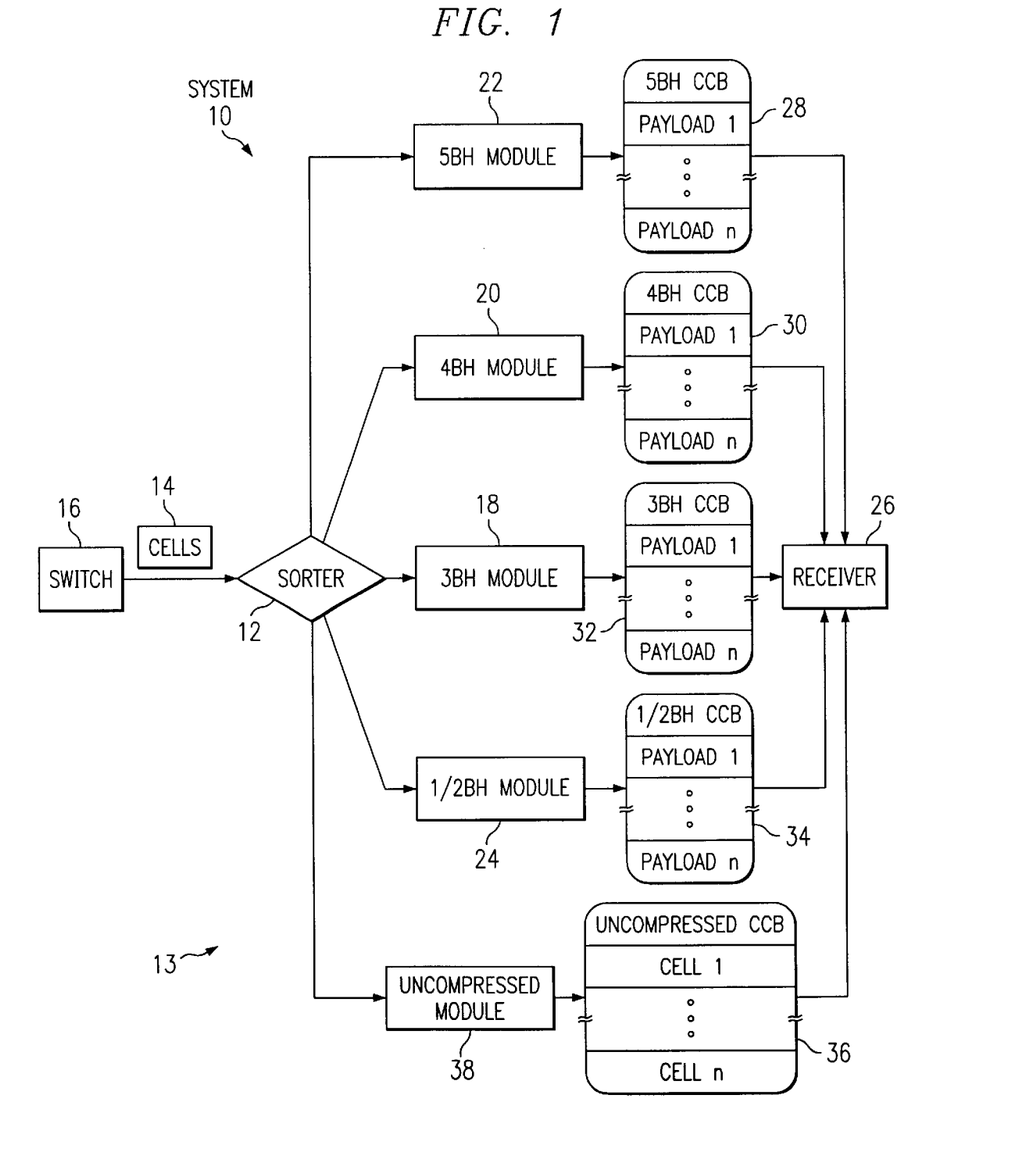
FIG. 1 illustrates an example system for compressing cell headers.

FIG. 1 illustrates an example system 10 for compressing cell headers. System 10 includes a sorter 12 that receives cells 14 from a switch 16. Sorter 12 may be operable to sort cells according to the destination addresses of cell headers and determine an appropriate module for compression. This determination may be made by counting the number of cells with substantially similar cell headers and selecting a compression module to optimize compression. A datagram that includes a compression control block (CCB) may then be generated by the appropriate compression module. The datagram is transmitted to receiver 26.

System 10 may include a portion of an ATM network. An ATM network includes at least one ATM switch and Data Terminal Equipment (DTEs). DTEs are connected physically to an ATM network switch and may support one or more network users with permanent or switched virtual circuits. For example, an ATM network may include a switch 16 as illustrated in FIG. 1. An ATM switch is responsible for cell transit through the network by reading incoming cells, updating cell header information, and switching the cells to an output interface towards their destination. An ATM switch supports two primary types of interfaces: a User to Network Interface (UNI) and a Network to Network Interface (NNI). A UNI is an interface point between ATM end users and a private ATM switch or between a private ATM switch and the public carrier ATM network. A NNI is an interface point between ATM switches defined as the interface between two network nodes. An ATM network may be depicted as a "cloud" where the user data is presented to the network at one end of the cloud. The data must travel through the cloud during transmission to the receiver. The receiver may be depicted at the other end of the cloud or even outside the cloud. In the illustrated example, switch 16 may be located at the edge of an ATM cloud, and receiver 26 may be outside the cloud. As such, the ATM interface at the switch may comprise a UNI. Additionally, system 10 may be contained within a permanent virtual circuit (PVC) which allows direct connectivity between sites.

The ATM cells may be packed in an open ISO Multi-Protocol Encapsulation (MPE) datagram for transmission over a communications link, including the Global Broadcast Service (GBS) satellite links. The GBS ground segment uses ATM cells as the underlying data transmission units for broadcasts. Because the ATM cells may be packed in an MPE datagram, system 10 may be compliant with the Digital Video Broadcast (DVB) standard. The DVB standard is a standard for the delivery of digital communications such as digital television and data services. The standard promulgated is from the International Organization for Standardization/ International ElectroTechnical Commission family of standards.

In the illustrated example, cells 14 may comprise ATM cells that may be fifty-three bytes in length. The first portion of the cell includes a five byte cell header. The remaining bytes make up the payload. Accordingly, a cell 14 may include forty-eight bytes of payload. Cells 14, however, may comprise any suitable type and size of cell. The five byte cell header includes a destination address in the form of address bits. The address and control bits of cells on a UNI interface may include a Generic Flow Control (GFC), Virtual Path Identifier (VPI), a Virtual Channel Identifier (VCI), a Payload Type (PT), a Cell Loss Priority (CLP), and a Header Error Control (HEC). The Generic Flow Control provides local functions, such as identifying multiple stations that share a single ATM interface. This field is typically not used and may be set to its default value. The Virtual Path Identifier and the Virtual Channel Identifier identify the next destination of cell 14 as cell 14 passes through a series of ATM switches 16 as it moves toward its destination. The Payload Type indicates in the first bit whether cell 14 contains user data or control data. The Cell Loss Priority indicates whether cell 14 should be discarded if the cell 14 encounters extreme congestion as it moves through the network, and the Header Error Control calculates a checksum on the header itself guaranteeing the integrity of the cell header. The cell header, however, may comprise any suitable type of information.

The header bytes are typically redundant for cells within a permanent virtual circuit. For example, if switch 16 is located on the edge of an ATM cloud, even cells with differing destination addresses may have substantially the same cell header. For example, since the Virtual Path Identifier and the Virtual Channel Identifier bits define the next destination for cells 14, three bytes of a five byte header are redundant for cells 14 with a given Permanent Virtual Circuit address. For a typical broadcast satellite system, such as Global Broadcast System (GBS), it is common to have less than a handful of Virtual Path Identifiers as input. The satellite broadcast system can re-map the external Virtual Path Identifiers to a single Virtual Path Identifier (making the Virtual Path Identifier equal to zero) for transmission to their receivers. Thus, Virtual Path Identifier transitions are few and may be reduced to zero by re-mapping. As another example, the Header Error Control field need not be transmitted across the UNI for each cell 14. It can be re-constructed instead by receiver 26.

In a five byte header this leaves only the General Flow Control, Payload Type and Cell Loss Priority bits as being unique to each cell 14. Accordingly, cell 14 with substantially similar headers may share a common General Flow Control, Virtual Channel Identifier, Virtual Path Identifier, Payload Type, and Cell Loss Priority. Due to the redundancy of these address bits in cells 14 within a Permanent Virtual Circuit, cells 14 may be said to have substantially similar destination addresses even where the actual end receiver differs. In other examples, cell 14 headers may share common characteristics without being identical. Substantially similar cell 14 headers may also include cells with common characteristics.

Sorter 12 is operable to receive cells 14 from switch 16, organize cells 14 into groups with substantially similar cell headers. The number of groups indicate the number of transitions for which the Compression Control Block may account. Sorter 12 may then use these transition counts to determine to which compression module the cells 14 should be routed. The sorter 12 and compression modules may be included in a DVB encapsulator 13.

Sorter 12 is also operable to count the number of cells 14 within each group. Cells 14 may be organized together in buffers to be later compressed into a datagram. As used in one example of the GBS, a datagram is 4,080 bytes in length. This length is typical for many communications applications and conforms to the Digital Video Broadcast (DVB) standard. Generally, seventy-six uncompressed cells 14 may be organized within a 4,080 byte section. However, eighty-five payloads, which each comprise forty-eight bytes, may fit into a 4,080 byte section. If the first payload in a 4,080 section is used to store the Compression Control Block, a maximum of eighty-four ATM cell payloads may be stored in the 4,080 byte section. Thus, in one example, compressed cell headers may allow eighty-four payloads to be organized in a encapsulated datagram 92. Sorter 12 may keep a running total of the cells 14 at switch 16. When eighty-four total cells are collected in the buffers, the data payloads are run length packed into the datagram 28, 30, 32, 34 and 36.

The datagram generated by the compression module may include a compression control block (CCB). The contents of the Compression Control Block (CCB) may vary depending upon the module chosen by sorter 12. As previously stated, sorter 12 may count the number of cells 14 that contain similar addresses and organize the cells into groups. Sorter 12 may then use these transition counts to determine to which compression module the cells 14 should be routed. In the illustrated example, system 10 includes a three byte header (3BH) module 18, a four byte header (4BH) module 20, a five byte header (5BH) module 22, and a half byte header (½BH) module 24. As will be described in greater detail later, the compression modules 18, 20, 22, and 24 may then compress cells 14 into the corresponding CCB. The compression modules 18, 20, 22, and 24 differ from each other according to the number of bytes of header that may be stored for each cell 14 in the corresponding CCB. Each compression module 18, 20, 22, and 24 is appropriately named. For example, the 5BH module 22 stores five bytes of header information for each cell 14 within the CCB, and the 4BH module 20 stores four bytes of header information for each cell 14 within the CCB. Compression modules, however, may be configured to store any suitable number of bytes or any suitable portion of the header.

The 5BH module 22, 4BH module 20, 3BH module 18, and ½BH module 24 compression methods can achieve maximum compression efficiency within their respective transitional limits. The larger the header to be stored, the fewer the transitions that can be compressed into a datagram. For example, the maximum number of transitions that the 3BH module 18 can accommodate maybe eleven. The 4BH module 20 and 5BH module 22 can accommodate fewer ATM header transitions, a maximum of nine and seven transitions, respectively. By distinguishing between the different compression modules and routing cells to the appropriate module, the sorter may achieve maximum compression efficiency.

As previously stated, each module may generate a datagram particular to the module. For example, the 5BH compression module 22 organizes cells 14 into a 5BH datagram 28. Likewise, the 4BH module 20 organizes cells into a 4BH datagram 30, and the 3BH module 18 organizes cells 14 into a 3BH datagram 32. The ½BH datagram 34 corresponds to the ½BH module 24. The datagram is sent to and received by receiver 26. Each datagram includes a Compression Control Block (CCB) for storing compressed header information. The CCB may comprise, for example, forty-eight bytes of header information. The contents of the CCB vary depending on the compression scheme performed by the module chosen by sorter 12.

Regardless of the compression module used, according to one embodiment, the first four bytes of a CCB are included in the MPE header. The MPE header stores header information applicable to the associated payloads. Thus, the first four bytes of each CCB includes the General Flow Control, the Virtual Path Identifier, the Virtual Channel Identifier, the Payload Type and Cell Loss Priority applicable to the MPE datagram as a whole. The fifth byte may be reserved for the compression mode indicator. The compression mode indicator comprises a tag that indicates whether the compressed cells are in a 5BH, 4BH, 3BH, or ½BH state. A compression mode indicator equal to zero may indicate that a datagram is uncompressed. With the exception of the 5BH CCB 28, the following three bytes may be reserved for other information.

For each transition, a byte is used to store a cell count. The cell count indicates the number of payloads associated with the transition. Stated differently, the cell count indicates the number of payloads with substantially similar cell headers and the number of payloads that may be sequentially stored in the datagram to which this particular header should be appended. For example, a 5BH CCB 28 may have a maximum of seven transitions, or a maximum of seven different groupings of cells with substantially similar cell headers. Consequently, within a 5BH CCB 28 seven different bytes may be used to store the cell count for each of the seven different transitions. All remaining bytes of the forty-eight byte CCB may be used to store header information. Thus, in a 5BH CCB 28 thirty-five bytes may be used to store header information.

The type of header information and the number of bytes used to stored header information for a transition depends upon the compression module chosen by sorter 12. For example, the 5BH CCB stores five bytes worth of header information for each transition. The bytes may include, for example, the Generic Flow Control (GFC), the Virtual Channel Identifier (VCI), the Virtual Path Identifier (VPI), the Payload Type (PT), the Cell Loss Priority (CLP), and the Header Error Control (HEC) for the transition. Bytes storing header information for the first transition in a 5BH CCB 28 may take the form as described in TABLE 1:

TABLE 1

| Index Entry | Byte Type | 5BH Description |
| --- | --- | --- |
| 7 | Transition A Header | GFC/Upper Half VPI |
| 8 | Transition A Header | Lower half VPI/Upper part VCI |
| 9 | Transition A Header | VCI |
| 10 | Transition A Header | Lower part VCI/PT/CLP |
| 11 | Transition A Header | HEC |

The Compression Control Blocks (CCB) associated with the other compression modules may differ somewhat from a 5BH CCB 28. A 4BH CCB may store four bytes worth of information for each transition. As described above, it may not be necessary to store the Header Error Control (HEC) byte in a 4BH CCB 30, a 3BH CCB 32, or a ½BH CCB 34. In some situations, eliminating the HEC byte does not substantially alter or compromise the integrity of the system. Thus, bytes storing header information for the first transition in a 4BH CCB 30 may take the form as described in TABLE 2:

TABLE 2

| Index Entry | Byte Type | 4BH Description |
| --- | --- | --- |
| 10 | Transition A Header | GFC/Upper Half VPI |
| 11 | Transition A Header | Lower half VPI/Upper part VCI |
| 12 | Transition A Header | VCI |
| 13 | Transition A Header | Lower part VCI/PT/CLP |

The 3BH CCB 32 stores three bytes worth of information for each transition. The bytes storing header information for the first transition in a 3BH CCB 32 may look similar to the 4BH CCB 32 above with the exception of omitting the byte storing the GFC/Upper half VPI. Accordingly, a limitation of the 3BH CCB 32 may be that the GFC bits and upper portion of the VPI must be zero.

The ½BH CCB 34 stores only half a byte worth of information for each transition. The stored half byte includes only the count of cells to follow and the PT/CLP header information. Thus, a limitation of the ½BH CCB may be that only the PT and CLP bits may vary. The bytes storing header information for the first four transitions in a 4BH CCB 30 may take the form described in TABLE 3:

TABLE 3

| Index Entry | Byte Type | 1/2BH Description |
| --- | --- | --- |
| 9 | Transition A Header | Count (4)/PT CLP (4) |
| 10 | Transition B Header | Count (4)/PT CLP (4) |
| 11 | Transition C Header | Count (4)/PT CLP (4) |
| 12 | Transition D Header | Count (4)/PT CLP (4) |

Figure 4:
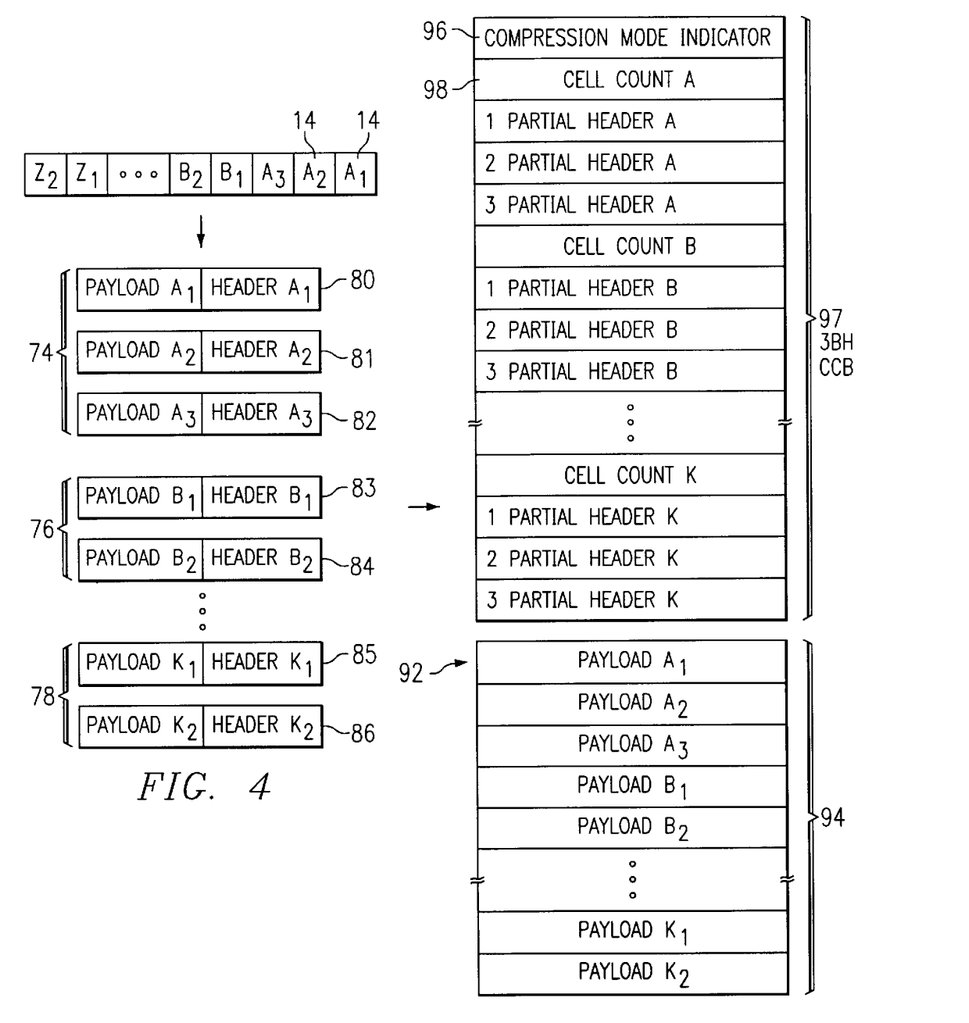
FIG. 4 illustrates an example of organizing cells within compression buffers.

The CCB is discussed in more detail with regard to FIG. 4. Bytes are illustrated as organized above for example purposes only. It is recognized that one skilled in the art may organize the bytes and information within the bytes in any suitable manner.

System 10 may take advantage of the repetitive nature of datagrams. If the cells in a datagram include substantially similar cell headers, much of the stored header bytes may be repetitive for each cell. "Each" as used in this document means each member of a set or each member of a subset of the set. If multiple cells are packed into a datagram, header bytes that are repetitive to each cell need only be stored once. Consequently, data communication is made more efficient by decreasing the amount of information traveling over the satellite. Previous approaches to ATM transmission fail to account for the repetitive nature in which cell headers appear within a datagram.

Additionally, system 10 may allow for effective compression of encrypted data. For security purposes, the payload portion of cells may be encrypted before transmission. In one example of encryption, the data is replaced with a non-human readable series of ones and zeros, or "white noise." Encryption of the cell payload, however, leaves no data behind that is capable of compression. System 10 compresses the cell header, which may provide for effective compression of encrypted data.

Figure 2:
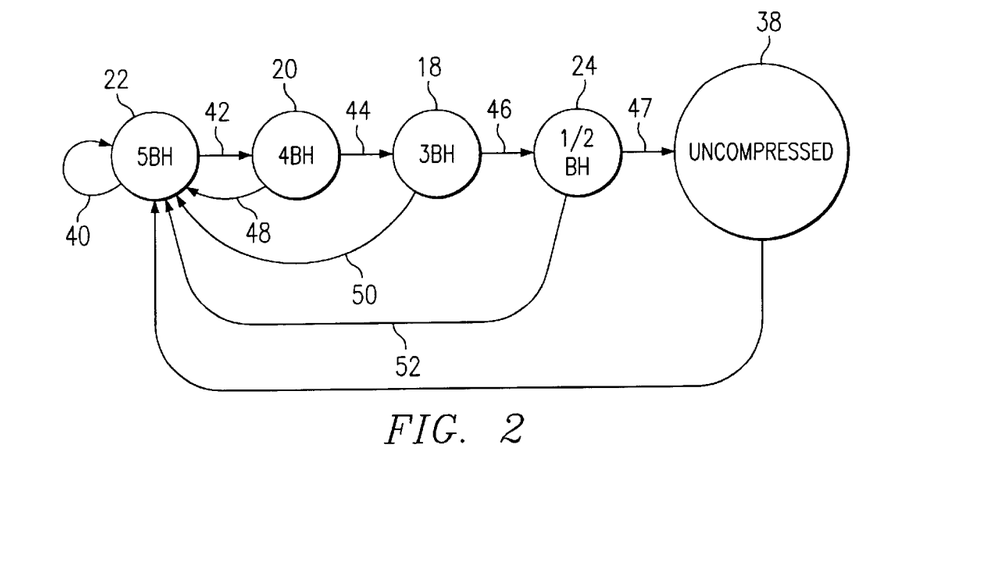
FIG. 2 illustrates an example method for organizing cells according to substantially similar cell headers for compression.

FIG. 2 illustrates an example method for organizing cells according to substantially similar cell headers for compression. According to the example, sorter 12 may organize cells according to substantially similar cell headers for compression by choosing the appropriate compression module 18, 20, 22, or 24 in order of minimal computational workload for the receiver 26. The sorter 12 and compression modules 18, 20, 22, and 24 may be included in a DVB encapsulator 13. The method begins at the 5BH module 22. As discussed with reference to FIG. 1, the 5BH module 22 can accommodate seven or fewer transitions or groups. Thus, if sorter 12 determines that the transition count is seven or fewer transitions, sorter 12 gathers cells 14 and transmits them to the 5BH module 22. Cells 14 may then be organized and compressed by the 5BH module 22 for transmission to receiver 26.

Alternatively, sorter 12 may determine that more than seven transitions occur for cells 14. Since a 5BH module 22 compression would be unsuccessful, sorter 12 may bypass the 5BH module 22 to determine the applicability of 4BH module 20. As previously stated, the 4BH module 20 can handle nine or fewer transitions. Thus, if sorter 12 has determined that cells 14 have more than seven transitions, sorter 12 transmits cells 14 to the 4BH module 20 at step 42. Cells 14 may then be organized and compressed for transmission to receiver 26.

If more than nine transitions occur in an incoming cells 14, the sorter may bypass 4BH module 20 compression at step 44 and transmit incoming cells 14 to the 3BH module 18. The 3BH module 18 can compress a maximum of eleven transitions. Thus, if the cells 14 can be grouped into eleven or fewer transitions, cells 14 may remain at the 3BH module 18. The cells 14 may then be organized by the 3BH module 18 for compression and transmission to receiver 26.

If more than eleven transitions are present, the sorter 12 may bypass the 3BH module 18 to attempt ½BH module 24 compression. The ½BH 24 compression module can accommodate a maximum of forty transitions. If cells 14 can be grouped within forty transitions, sorter 12 may organize cells 14 and transmit them to the ½BH module 24 at step 46. The ½BH module 24, however, stores less cell header information than the 5BH module 22, 4BH module 20, or 3BH module 18. As previously discussed in regard to FIG. 1, the ½BH module 24 may include additional limitations that could impede compression.

If the sorter determines that incoming cells 14 can not be grouped such that 5BH module 22, 4BH module 20, 3BH module 18, or ½BH module 24 compression would be successful, the system enters into exception processing. Cells 14 are organized at step 47 into an uncompressed datagram 38 and sent to receiver 26 in an uncompressed state 38. The method then returns to the beginning with the sorter 12 first attempting to organize incoming cells 14 into a 5BH compression module 22. Cells 14 may continue through steps 40–47, as described above, until cells 14 are transmitted.

In another embodiment and in recognition of the repetitive nature of data stream content, the compression method may reduce transmitter computational workload by avoiding unnecessary transitions between compression schemes. Once sorter 12 has recognized that incoming cells 14 are best suited for a particular compression module, sorter 12 may attempt to place the next grouping of cells 14 into the same compression module. Thus, the sorter 12 may attempt to remain in a previously successful state. For example, if 5BH module 22 compression is successful, the sorter may attempt to organize the next group of incoming cells 14 into seven transitions or less such that these cells are also be organized by the 5BH module 22. Accordingly, sorter 12 loops back to the 5BH module 22 at step 40.

Similarly, if sorter 12 has determined that 4BH module 20 is the appropriate compression scheme, sorter 12 continues to organize incoming cells 14 into a 4BH compression module 20 for as long as appropriate. At some point, 4BH compression may fail because the next cells 14 may include more than nine transitions. As discussed above, sorter 12 then attempts a 3BH module 18 compression and then a ½BH module 24 compression before entering into exception processing.

Regardless of the final disposition of these cells, when sorter 12 receives the next grouping of incoming cells 14, it first attempts 4BH compression. This is the attempt of sorter 12 to avoid unnecessary transitions attempt. Although the 4BH module 20 compression failed for the immediately preceding set of cells 14, sorter 12 may assume that since the 4BH module 20 compression was the appropriate scheme for prior sets of incoming cells 14, the 4BH module 20 is again the most appropriate compression scheme. In this manner, sorter 12 is bypassing the 5BH module 22.

This procedure may repeat for a predetermined number N of cycles. At some point, system 10 recognizes that the current module, in this example, the 4BH module 20, is no longer appropriate and is failing too frequently. Thus, after N failures, the method returns at step 48 to the 5BH module 22, and the method begins again. When sorter 12 receives the next grouping of incoming cells 14, sorter 12 returns to the beginning of the method by first attempting to organize the cells 14 into a 5BH module 22. The 3BH module 18 and the ½BH module 24 also have corresponding steps 50 and 52, respectively, which return the method back to the starting point after N failures. In one example, the number of N failures that will cause the method to return start over may be the same for each compression module. For example, the value of N failures may be set to five for steps 48, 50, and 52. After five compression failures the method will begin again regardless of whether the compression failure occurred at the 4BH module 20, the 3BH module 18, or the ½ BH module 24. In another example, the number of N failures that will cause the method to start over may be different for each compression module. For example, N at step 48, step 50, and step 52 may be set to three, four, and five compression failures, respectively. Thus, after three compression failures at the 4BH module 20, the method will begin again. Similarly, after four and five compression failures at the 3BH module 18 and ½ BH module 24, respectively, the method will begin again.

Figure 3:
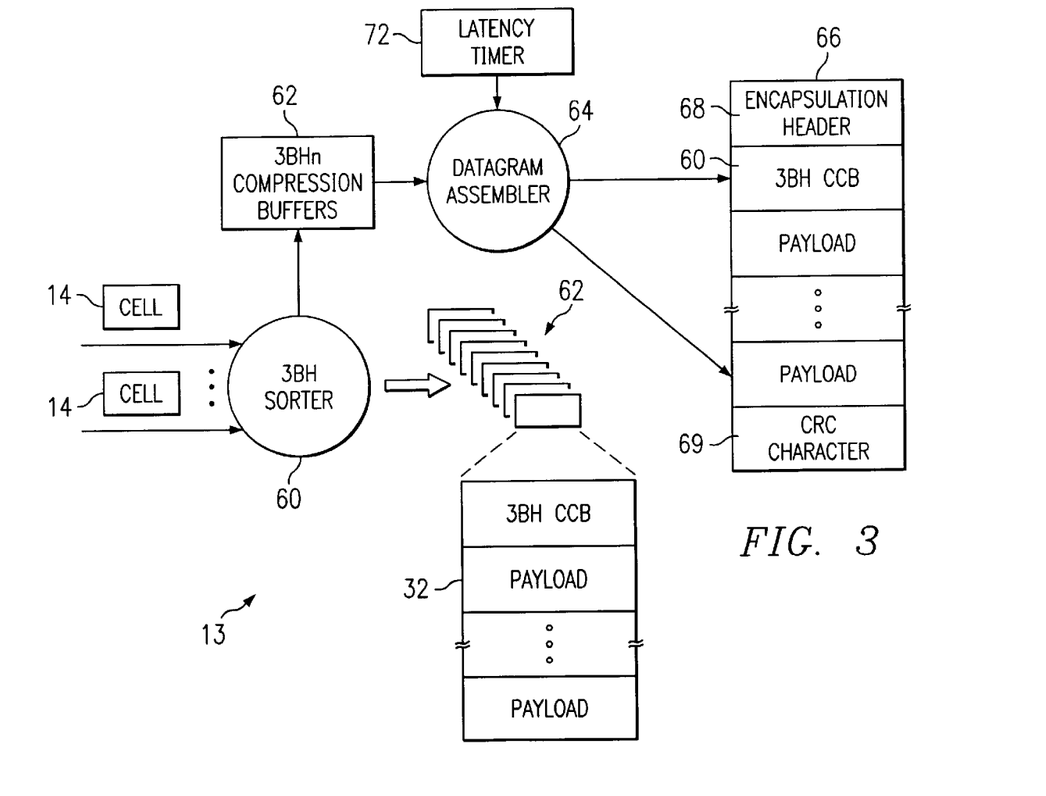
FIG. 3 illustrates an example of a three byte compression module.

FIG. 3 illustrates an example of a 3BH module 18. The 3BH module 18 may be included in a DVB encapsulator 13 that also comprises a 5BH module 22, a 4BH module 20, a 3BH module 18, and a ½ BH module 24. The 3BH module 18 may include a 3BH sorter 60, a plurality of 3BH compression buffers 62, and a datagram assembler 64. In one example, 3BH module 18 receives cells 14 from the sorter 12 and forwards cells 14 to the 3BH sorter 60. The 3BH sorter 60 then organizes cells 14 into 3BH compression buffers 62. An example of organizing cells 14 is presented with reference to FIG. 4. Alternatively or additionally, in another example, sorter 12 may perform the functions of the 3BH sorter 60 by organizing cells into 3BH compression buffers 62. Thus, system 10 may include one sorter 12 or a plurality of sorters 12 and 60. The cells 14 are then formed into datagram 32.

The 3BH compression buffers 60 store multiple datagrams 32, which are shipped to a datagram assembler 64.

The datagram assembler 64 is operable to assemble datagrams 32 that include compressed cells 14 into a encapsulated datagram 66. In preparing the encapsulated datagram 66, datagram assembler 64 appends a encapsulation header 68 to encapsulated datagram 92. Encapsulation header 68 provides the address common to each cell 14 in encapsulated datagram 92. The address included in encapsulation header 68 ensures that encapsulated datagram 92 is transmitted to the appropriate receiver 26.

Datagram assembler 64 may also append a Cyclic Redundancy Check (CRC) character 69 to the datagram. The CRC character 69 may be used to check the integrity of a block of data. For example, CRC character 69 may be used at the transmission end to generate a value that depends on the hexadecimal value of the number of ones in the data block. Datagram assembler 64 calculates the value and appends it to the datagram as CRC character 69. Receiver 26 makes a similar calculation and compares its results with the added CRC character 69. If there is a difference, receiver 26 requests retransmission. Any other suitable method of establishing data integrity, however, may be used.

In one example, 3BH module 18 also includes a latency timer 72. Latency timer 72 performs a check upon the datagram assembler 64. If after a predetermined amount of time, datagram assembler 64 is unable to pack the 3BH compression buffers 62 into a datagram 66, the latency timer 72 sends a message to the datagram assembler 64 that cells 14 should be sent uncompressed. Latency timer 72 may ensure the efficiency of system 10.

Although FIG. 3 illustrates an example of a 3BH module 18, it is also representative of an example of a 4BH module 20 or a 5BH module 22. Additionally, although the 3BH module 18 is shown to include 3BH sorter 60, the functions of 3BH sorter 60 could be performed by sorter 12 or any other feature operable to organize incoming data. Thus, system 10 may include one sorter 12 or a plurality of sorters.

Similarly, the 3BH module is shown in FIG. 3 to include a datagram assembler 64. One of ordinary skill in the art could recognize that each module in system 10 could include a datagram assembler 64 associated with the particular module. Alternatively or additionally, a single datagram assembler 64 operable to pack compression buffers from every compression module could be included in system 10. Thus, numerous variations and alterations to system 10 could be made without departing from the scope of the invention.

FIG. 4 illustrates an example of organizing cells 14 within compression buffers. In one example, incoming cells 14 are received by 3BH sorter 60. Each cell 14 includes a header and payload. The cells 14 are sorted by grouping cells 14 with similar headers into transitions, as described in regard to FIG. 1. In the example illustrated by FIG. 4, 3BH sorter 60 determines that there are three cells 14 with similar header A. These may be designated as transition A 74 and include cells A1 80, A2 81, and A3 82. Additionally, the 3BH sorter 60 determines that there are two cells 14 with similar header B. These are designated as transition B 86 and include cells B1 83 and B2 84.

Cells 14 are grouped in this manner until the maximum capacity of the 3BH compression buffer 62 is reached. In one example, the maximum capacity of a 3BH compression buffer 62 may be 84 cells. In the example illustrated in FIG. 4, the final group of cells 14 is designated as transition K 88 and includes cells K1 85 and K2 86. It should be noted that the inclusion in FIG. 4 of three cells within transition A 84, two cells within transition B 86, and two cells within transition K 88 is for example purposes only. A person of ordinary skill in the art should realize that the cells 14 could be received by 3BH sorter 60 in any of a number of combinations and variations.

The 3BH sorter 60 arranges the grouped cells 14 into an encapsulated 3BH datagram 92. Encapsulated 3BH datagram 92 includes a 3BH CCB 97, which stores header information for cells A1 80 through K2 86, and describes an arrangement of payloads 94 corresponding to each cell. The 3BH CCB 97 includes a compression mode indicator 96 that indicates the compression mode, in this example, a 3BH compression mode. Receiver 26 uses the compression mode indicator 96 to determine the steps necessary to decompress encapsulated datagram 92. The 3BH CCB 97 includes a cell count A 98, which indicates how many cells are in transition A 74. Because there are three cells in transition A 74, cell count A 98 would be equal to three in the example depicted in FIG. 4. 3BH CCB 97 includes three bytes of header information pertinent to the cells within transition A 74. The 3BH CCB 97 stores like information for every transition within encapsulated datagram 92.

Following the 3BH CCB 97, encapsulated datagram 92 includes payloads 94 for each cell header compressed into the encapsulated datagram 92. The payloads may be arranged sequentially. When received by receiver 26, the receiver 26 may go down the list of partial headers in the 3BH CCB 97, and append to the payload the appropriate header based on the count for the transition as stored in the CCB. For example, if the 3BH CCB 97 indicates that there are three cells within the transition as shown in FIG. 4, the receiver 26 may append the cell header to the first three payloads. In the illustrated example, a maximum of 84 payloads may be included in 3BH CCB 97.

Figure 5:
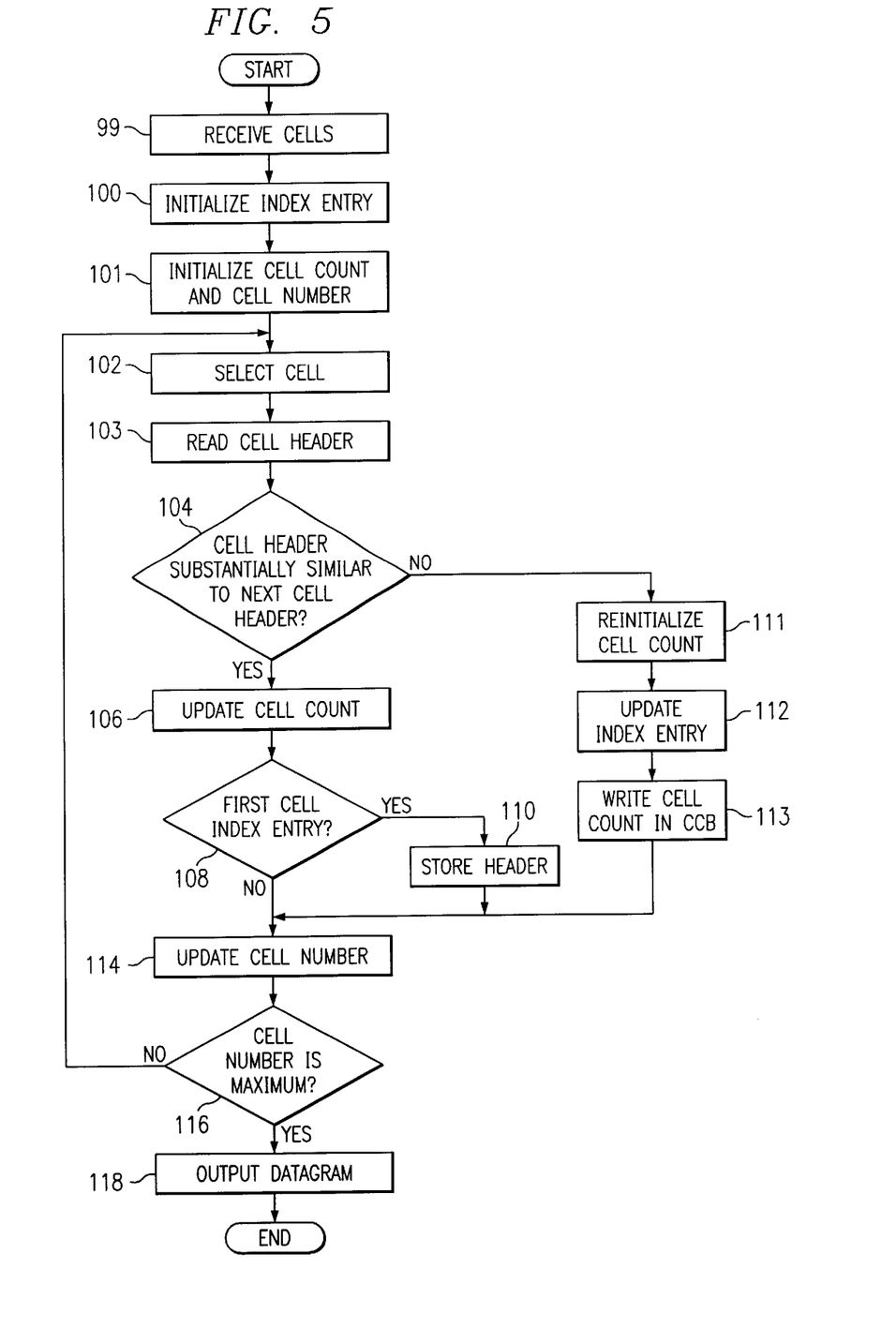
FIG. 5 illustrates an example method for using the system of FIG. 1 for compressing cell headers.

FIG. 5 illustrates an example method for using the system of FIG. 1 for compressing cell headers. The method begins at step 99, where the system 10 receives incoming cells 14 at a switch 16. At step 100, system 10 initializes the index entry by setting it equal to zero. The index entry indicates the number of transitions, or the number of groupings of cells with substantially similar cell headers. At step 101, system 10 initializes the cell count and the cell number by setting each to zero. The cell count indicates the number of cells within a transition. The cell number may be equal to the number of cells that are in a datagram. The initialization of the index entry and cell count prepares system 10 to read multiple incoming cells 14 for compression in a single datagram to be transmitted to receiver 26.

System 10 selects a cell at step 102 and reads the cell header at step 103. Sorter 12 examines the cells 14 and determines at step 104 whether the cell header is substantially similar to the next cell header. The determination is made by comparing the header of the first incoming cell 14 with the cell header of the next incoming cell 14. If the cell headers are identical, system 10 updates the cell count of the present cell at step 106. Updating the cell count indicates to receiver 26 that this is m of n sequential cells 14 within a transition. The sorter 12 may update the cell count by adding one to the cell count. Thus, if sorter 12 is examining the first incoming cell, the cell count would be updated to a value of one. Accordingly, if sorter 12 is examining the second incoming cell and sorter 12 previously determined that the last cell header is identical to this cell header, the cell count would be updated to a value of two. As sorter 12 reads more sequentially identical cell headers, the cell count is increased each time by a value of one.

After updating the cell count, sorter 12 proceeds to step 108 to determine whether the cell 14 is the first cell of the index entry. Sorter 12 may make this determination by comparing this cell header with the last cell header or by looking at the cell count. If the headers are different, the current cell under examination is the first cell of this index entry. In this situation, sorter 12 then stores the header at step 110. The number of bytes stored and the format in which the bytes are stored varies depending on the compression module used and the CCB generated. This is described in greater detail in regard to FIG. 1.

If the cell 14 is not the first cell 14 of the index entry at step 108, the method skips step 110 and proceeds directly to step 114. Step 110 is not necessary because the cell header for this transition has already been stored in the CCB.

If sorter 12 determines at step 104 that the cell header of this cell 14 is not substantially similar to the cell header of the next cell 14, the method proceeds to step 111; the system reinitializes the cell count. The cell count is reinitialized because system 10 determined that this cell 14 is the last cell in a transition. The final cell count represents the total value for this transition that will be stored in the CCB as cell count 98, as shown in FIG. 4. The cell count may be initialized by setting it equal to zero. At step 112, the system 10 updates the index entry. By updating the index entry, sorter 12 prepares system 10 for the next transition. The assigned cell index entry is then stored in the CCB as shown in TABLES 1 through 3 above at step 113. The method then proceeds to step 114.

At step 114, the sorter 12 updates the cell number by assigning the cell the next available cell number. In the illustrated example, the cell index number is updated by increasing the cell number by a value of one. For example, if the previous cell was assigned a cell number of fifteen the current cell 14 under examination would be assigned a value of sixteen.

Sorter 12 determines at step 116 whether the cell number is a maximum number. The maximum number is the maximum number of cells for which a datagram can accommodate. Thus, sorter 12 determines whether the datagram is at its maximum capacity. For example, a 3BH CCB reaches maximum capacity after storing eighty-four cells. If sorter 12 determines that eighty-four cells have been stored in the CCB, the datagram is at maximum capacity and the method proceeds to step 118. At step 118, the output datagram is transmitted to receiver 26. If sorter 12 determines at step 116 that the CCB is not at maximum capacity, the system 10 returns to step 102. Sorter 12 then cycles repeatedly through steps 102 to 116 until the maximum capacity of the CCB is reached.

System 10 for compressing cell headers may proceed through the compression process in the order shown in steps 100 through 118 in FIG. 5 and as described above. It is recognized, however, that one skilled in the art may perform the steps of the method in any suitable order.

Figure 6:
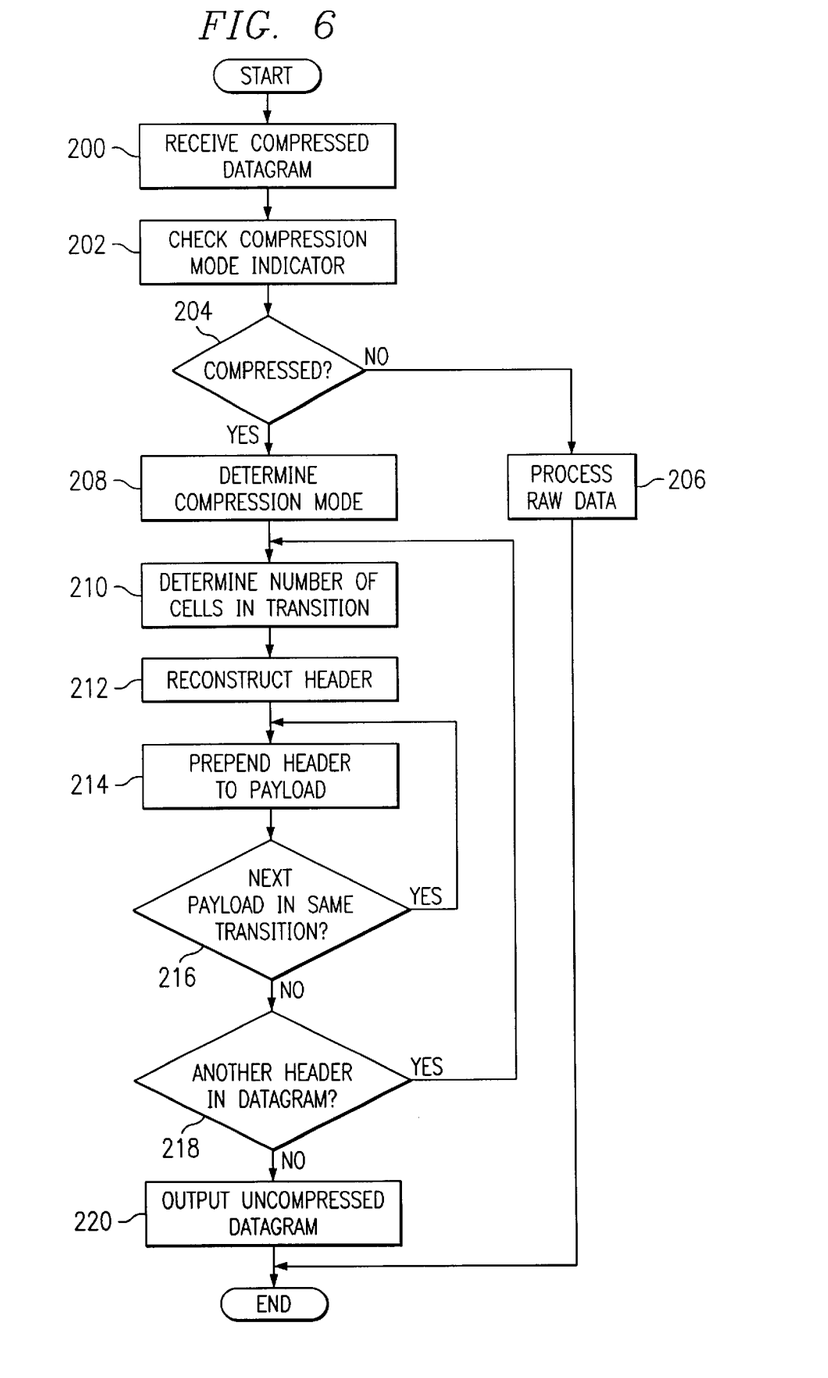
FIG. 6 illustrates an example method for using the system of FIG. 1 for decompressing cell headers.

FIG. 6 illustrates an example method for using the system of FIG. 1 for decompressing cell headers. The method begins at step 200 when receiver 26 receives a compressed datagram 66. At step 202, receiver 26 checks the compression mode indicator. The check is made by receiver 26 to determine whether or not the datagram is compressed and the compression mode used, if any. At step 202, receiver 26 determines whether the compression mode indicator indicates whether the datagram is compressed. For example, a compression mode indicator equal to a zero, may indicate that the datagram is uncompressed. A compression mode indicator equal to a non-zero may indicate that the datagram is compressed. If the compression mode indicator is set to zero, receiver 26 processes raw uncompressed data at step 206. The data may be processed immediately by receiver 26 and the method terminates. If the compression mode indicator indicates that a compression module has been used, the method proceeds to step 208. At step 208, receiver 26 determines the compression mode. The procedure for decompressing a datagram depends upon the particular compression mode used to compress the datagram 66.

Regardless of the compression module used, the number of cells in a transition is determined at step 210. Receiver 26 may make this determination by reading the cell count 98 included in datagram 66. At step 212, receiver 26 reconstructs the header. Step 212 may vary depending on the particular compression module used. For example, because the compressed header in a 5BH datagram 28 includes the Header Error Control (HEC) byte, the receiver of a 5BH datagram 28 need not compute the cell HEC byte. Receiver 26 takes the first five bytes of stored header information in the CCB of the 5BH datagram 28 and stores them as decompressed cell header bytes 1, 2, 3, 4, and 5. This reconstructed header is used for the associated payloads within a transition. The receiver need only append the complete five byte header to each data payload as indicated by the count.

If receiver 26 determines at step 208 that datagram 66 was compressed using the 4BH module 20, at step 212 the receiver 26 takes the first four bytes of stored header information in the CCB of the 4BH datagram 30 and stores them as decompressed cell header bytes 1, 2, 3, and 4. Because the HEC byte was not stored, the receiver 26 may recreate the HEC byte and place it as the fifth and final byte in the decompressed cell header. The header may then be appended to each data payload in the transition as indicated by the count. Because the HEC must be reconstructed, decompression of a 4BH CCB 30 may require more processing time on the receiver 26 end than does decompression of a 5BH CCB 28. Much of the processing, however, may occur on the compression end of the system at the sorter 12, so the process of decompression may be made simpler at the receiver 26 end.

Similarly, if system 10 determines at step 208 that datagram 66 was compressed using the 3BH module 18, the receiver 26 takes the first three bytes of stored header information in the 3BH datagram 32 and stores them as decompressed cell header bytes 2, 3, and 4 at step 212. The receiver 26 may reconstruct the first byte by substituting a zero for it. The HEC byte may be reconstructed as described above with reference to decompression of a 4BH datagram 30 and placed as the fifth and final cell header byte. In other embodiments, the HEC need not be computed if it has been recomputed by a receiving an ATM Network Interface Card. This reconstructed header may be appended to each data payload in the transition as indicated by the cell count. Because decompression requires reconstructing both the first cell header byte and the HEC byte, decompression of a 3BH CCB 32 may require more processing time on the receiver 26 end than does decompression of a 5BH CCB 28 or 4BH CCB 30. Much of the processing, however, may occur on the compression end of the system at the sorter 12, so the process of decompression may be made simpler at the receiver 26 end.

By contrast, if receiver 26 determines at step 208 that datagram 66 was compressed using the ½BH module 24, the receiver 26 takes the first three and one-half bytes of header information from the CCB and stores them as header bytes 1, 2, 3, and 4 at step 212. The receiver 26 makes as many copies of the header as is indicated in the count. A nibble may comprise half of a byte. The PT-CLP nibble is inserted in the lower nibble of the fourth byte. The HEC byte is reconstructed as described above with reference to decompression of a 4BH CCB 30 and placed as the fifth and final cell header byte. In other embodiments, the HEC need not be computed if it has been recomputed by the receiving ATM Network Interface Card. Each complete decompressed cell header is appended to the appropriate payload in the data section. Decompression continues until each PT-CLP nibble is used. Because only the PT and CLP bits may vary, if other bits are changing, for example, the address, the ½BH compression module 24 may not be used. The information may be sent in another module or uncompressed.

Following reconstruction of the header at step 212, receiver 26 prepends the header to the payload at step 214. Receiver 26 may determine if the next payload is in the same transition at step 216. If the next payload is within the same transition, the cell count has not been exhausted, the method returns to step 214. Receiver 26 prepends the header to the payload of the next payload as well. Steps 216 and 214 repeat as many times until all payloads within a transition have received a header. When receiver 26 determines at step 216 that the next payload is not in the same transition, receiver 26 may determine whether there is another header in the datagram 66 at step 218. If further header information is stored in the datagram 66 for a different transition, or a different group of cells with substantially similar cell headers, the method returns to step 210. The method cycles through steps 210 through 218 until a header has been appended to each payload in the datagram. When receiver 26 determines at step 218 that there is no further header information stored in the datagram 66, receiver 26 outputs the uncompressed datagram at step 220, and the method concludes.

Receiver 26 for decompressing cell headers may proceed through the compression process in the order shown in steps 200 through 218 in FIG. 6 and as described above. It is recognized, however, that one skilled in the art may perform the steps of the method in any suitable order.

Certain examples described above with regard to FIGS. 1 through 6 of the invention may provide one or more technical advantages. A technical advantage of one example may be that the example provides for cell header compression and increases the efficiency of satellite communication. Another technical advantage of an example may be that the example allows cell header compression compliant with the DVB standard and, thus, compliant with existing DVB hardware. Another technical advantage of an example may be that the example may utilize asymmetrical compression processing, which may reduce computational workload for the receiver as the bulk of the computational workload may be performed by the transmitter instead of the receiver. Another technical advantage provided by an example may be that the example may allow cell header compression of encrypted data. Other technical advantages may be readily apparent to one skilled in the art from the figures, descriptions and claims described herein. None, some, or all of the examples may provide technical advantages.

Although an example of the invention and its advantages are described in detail, a person skilled in the art could make various alterations, additions, and omissions without departing from the spirit and scope of the present invention as defined by the appended claims.

What is claimed is:
1. A cell header compression system, comprising:
a sorter operable to:
  receive a plurality of cells, a cell comprising a cell header and a payload;
  sort the cells according to the cell headers;
  compare the cell headers of the cells;
  identify a plurality of substantially similar cell headers;
  group the cells into a plurality of groups according to the substantially similar cell headers; and
  select a compression module from a plurality of compression modules in response to the number of groups to generate a compression control block;
the plurality of compression modules, a compression module operable to generate a compression control block describing the cell headers and an arrangement of the payloads according to the cell headers, the plurality of compression modules comprising:
  a first compression module operable to store a first number of bytes for each cell header of a first group; and
  a second compression module operable to store a second number of bytes for each cell header of a second group; and
a datagram assembler operable to:
  assemble the payloads according to the arrangement;
  generate a datagram comprising the generated compression control block and the assembled payloads; and
  transmit the datagram.
2. A cell header compression system, comprising:
a sorter operable to:
  receive a plurality of cells, a cell comprising a cell header and a payload;
  sort the cells according to the cell headers; and
  select a compression module from the plurality of compression modules to generate a compression control block by selecting a previously successful compression module for a predetermined number of cycles;
a plurality of compression modules, a compression module operable to generate a compression control block describing the cell headers and an arrangement of the payloads according to the cell headers, the plurality of compression modules comprising:
  a first compression module operable to store a first number of bytes for each cell header of a first group; and
  a second compression module operable to store a second number of bytes for each cell header of a second group; and
a datagram assembler operable to:
  assemble the payloads according to the arrangement;
  generate a datagram comprising the compression control block and the assembled payloads; and
  transmit the datagram.
3. A cell header compression system, comprising:
a sorter operable to:
  receive a plurality of cells, a cell comprising a cell header and a payload; and
  sort the cells according to the cell headers;
a compression module operable to generate a compression control block describing the cell headers and an arrangement of the payloads according to the cell headers, the compression control block comprising a compressed cell header selected from a group consist- ing of a five byte header, a four byte header, a three byte header, and a half byte header; and a datagram assembler operable to:
- assemble the payloads according to the arrangement;
- generate a datagram comprising the compression control block and the assembled payloads; and
- transmit the datagram.

4. A cell header compression system, comprising:

a sorter operable to:
- receive a plurality of cells, a cell comprising a cell header and a payload; and
- sort the cells according to the cell headers;

a compression module operable to generate a compression control block describing the cell headers and an arrangement of the payloads according to the cell headers, the compression control block describing a plurality of destination addresses for a number of cells of a plurality of transitions, the destination address for each cell of a transition being substantially similar; and a datagram assembler operable to:
- assemble the payloads according to the arrangement;
- generate a datagram comprising the compression control block and the assembled payloads; and
- transmit the datagram.

5. The cell header compression system of claim 4, wherein the cells comprise a plurality of asynchronous transfer mode cells.

6. The cell header compression system of claim 4, further comprising an encapsulator comprising:
- the sorter;
- the compression module; and
- the datagram assembler.

7. The cell header compression system of claim 4, wherein the sorter is operable to sort the cells according to the cell headers by:
- comparing the cell headers of the cells, a cell header comprising a destination address of the plurality of destination addresses;
- identifying a plurality of substantially similar cell headers; and
- grouping the cells according to the substantially similar cell headers.

8. The cell header compression system of claim 7, wherein substantially similar cell headers comprises substantially similar destination addresses.

9. The cell header compression system of claim 4, further comprising a plurality of compression modules comprising:
- a first compression module operable to store a first number of bytes for each cell header of a first group; and
- a second compression module operable to store a second number of bytes for each cell header of a second group.

10. A cell header compression system, comprising:

a sorter operable to:
- receive a plurality of cells, a cell comprising a cell header and a payload; and
- sort the cells according to the cell headers;

a compression module operable to generate a compression control block describing the cell headers and an arrangement of the payloads according to the cell headers, the compression module operable to generate a compression control block by:
- determining a number of cells of a subset of cells, each cell of the subset having a substantially similar cell header;
- writing the substantially similar cell header to the compression control block; and
- writing the number of cells of the subset of cells to the compression control block; and a datagram assembler operable to:
- assemble the payloads according to the arrangement;
- generate a datagram comprising the compression control block and the assembled payloads; and
- transmit the datagram.

11. A cell header compression system, comprising:

a sorter operable to:
- receive a plurality of cells, a cell comprising a cell header and a payload; and
- sort the cells according to the cell headers;

a compression module operable to generate a compression control block describing the cell headers and an arrangement of the payloads according to the cell headers; and a datagram assembler operable to:
- assemble the payloads according to the arrangement;
- generate a datagram comprising the compression control block and the assembled payloads; and
- transmit the datagram, wherein the datagram assembler comprises a latency timer operable to terminate assembly of the datagram after a predetermined period of time.

12. A cell header compression system, comprising:

a sorter operable to:
- receive a plurality of cells, a cell comprising a cell header and a payload; and
- sort the cells according to the cell headers;

a compression module operable to generate a compression control block describing the cell headers and an arrangement of the payloads according to the cell headers; and a datagram assembler operable to:
- assemble the payloads according to the arrangement;
- generate a datagram comprising the compression control block and the assembled payloads, wherein the datagram further comprises a cyclic redundancy check character used to check the integrity of the datagram; and
- transmit the datagram.

13. A cell header compression system, comprising:

a sorter operable to:
- receive a plurality of cells, a cell comprising a cell header and a payload; and
- sort the cells according to the cell headers;

a compression module operable to generate a compression control block describing the cell headers and an arrangement of the payloads according to the cell headers; and a datagram assembler operable to:
- assemble the payloads according to the arrangement;
- generate a datagram comprising the compression control block and the assembled payloads; and
- transmit the datagram; and a receiver operable to:
- receive the datagram transmitted by the datagram assembler;
- identify a compressed cell header of the compression control block as associated with at least one payload;
- decompress the cell header; and
- prepend the decompressed cell header to the at least one payload associated with the compressed cell header.

14. A cell header compression system, comprising:
a sorter operable to:
receive a plurality of cells, a cell comprising a cell header and a payload, wherein the payload comprises encrypted data; and
sort the cells according to the cell headers;
a compression module operable to generate a compression control block describing the cell headers and an arrangement of the payloads according to the cell headers; and
a datagram assembler operable to:
assemble the payloads according to the arrangement;
generate a datagram comprising the compression control block and the assembled payloads; and
transmit the datagram.

15. A cell header compression system, comprising:
a sorter operable to:
receive a plurality of cells, a cell comprising a cell header and a payload; and
sort the cells according to the cell headers;
a compression module operable to generate a compression control block describing the cell headers and an arrangement of the payloads by repeating the following for a predetermined number of cells:
determine a number of a subset of the cells, each cell of the subset having a substantially similar cell header;
write the substantially similar cell header to the compression control block; and
write the number of cells of the subset to the compression control block; and
a datagram assembler operable to:
assemble the payloads according to the arrangement;
generate a datagram comprising the compression control block and the assembled payloads; and
transmit the datagram.

16. The cell header compression system of claim 15, wherein the cells comprise a plurality of asynchronous transfer mode cells.

17. The cell header compression system of claim 15, further comprising an encapsulator comprising:
the sorter;
the compression module; and
the datagram assembler.

18. The cell header compression system of claim 15, wherein the sorter is operable to sort the cells according to the cell headers by:
comparing the cell headers of the cells, a cell header comprising a destination address;
identifying a plurality of substantially similar destination addresses of the cell headers; and
grouping the cells according to the substantially similar destination addresses.

19. The cell header compression system of claim 15, further comprising a plurality of compression modules comprising:
a first compression module operable to store a first number of bytes for each cell header of a first group; and
a second compression module operable to store a second number of bytes for each cell header of a second group.

20. The cell header compression system of claim 19, wherein the sorter is further operable to:
compare the cell headers of the cells;
identify a plurality of substantially similar destination addresses of the cell headers;
group the cells into a plurality of groups according to the substantially similar destination addresses; and
select the compression module in response to the number of groups.

21. The cell header compression system of claim 19, wherein the sorter is operable to select a compression module by selecting a previously successful compression module for a predetermined number of cycles.

22. The cell header compression system of claim 15, wherein the compression control block comprises a compressed cell header selected from a group consisting of a five byte header, a four byte header, a three byte header, and a of half byte header.

23. The cell header compression system of claim 15, wherein the compression control block describes a plurality of destination addresses for a number of cells of a plurality of transitions, the destination address for each cell of a transition being substantially similar.

24. The cell header compression system of claim 15, wherein the datagram assembler comprises a latency timer operable to terminate assembly of the datagram after a predetermined period of time.

25. The cell header compression system of claim 15, wherein the datagram further comprises a cyclic redundancy check character used to check the integrity of the datagram.

26. The cell header compression system of claim 15 further comprising a receiver operable to:
receive the datagram transmitted by the datagram assembler;
identify a compressed cell header of the compression control block as associated with at least one payload;
decompress the cell headers; and
append the decompressed cell header to the at least one payload associated with the compressed cell header.

27. The cell header compression system of claim 15, wherein the payload comprises encrypted data.

28. A method of cell header compression, comprising:
receiving a plurality of cells, a cell having a cell header and a payload;
sorting the cells according to the cell headers;
selecting a compression module from a plurality of compression modules by selecting a previously successful compression module for a predetermined number of cycles, the plurality of compression modules comprising a first compression module operable to store a first number of bytes for each cell header of a first group, and a second compression module operable to store a second number of bytes for each cell header of a second group;
generating a compression control block describing the cell headers and an arrangement of the payloads according to the cell headers by generating the compression control block using the selected compression module;
assembling the payloads according to the arrangement; and
generating a datagram with the compression control block and the assembled payloads.

29. A method of cell header compression, comprising:
receiving a plurality of cells, a cell having a cell header and a payload;
sorting the cells according to the cell headers;
generating a compression control block describing the cell headers and an arrangement of the payloads according to the cell headers, the compression control block comprising a cell compression header selected from a group consisting of a five byte header, a four byte header, a three byte header, and a half byte header;

assembling the payloads according to the arrangement; and generating a datagram with the compression control block and the assembled payloads.

30. A method of cell header compression, comprising:

receiving a plurality of cells, a cell having a cell header and a payload;

sorting the cells according to the cell headers;

generating a compression control block describing the cell headers and an arrangement of the payloads according to the cell headers, the compression control block describing a plurality of destination addresses for a number of cells of a plurality of transitions, the destination address for each cell of a transition being substantially similar;

assembling the payloads according to the arrangement; and generating a datagram with the compression control block and the assembled payloads.

31. The method of cell header compression of claim 30, wherein the cells comprise a plurality of asynchronous transfer mode cells.

32. The method of cell header compression of claim 30, wherein receiving the cells comprises:

receiving the cells at a switch; and transmitting the cells to an encapsulator, the encapsulator comprising:
a sorter;
a compression module; and
a datagram assembler.

33. The method of cell header compression of claim 30, wherein sorting the cells according to the cell headers comprises:

comparing the cell headers of the cells, a cell header comprising a destination address of the plurality of destination addresses;

identifying a plurality of substantially similar cell headers; and grouping the cells according to the substantially similar cell headers.

34. The method of cell header compression of claim 33, wherein identifying a plurality of substantially similar cell headers comprises identifying substantially similar destination addresses.

35. The method of cell header compression of claim 30, wherein sorting cells according to cell headers comprises:

comparing the cell headers of the cells;

identifying at least two substantially similar destination addresses of the cell headers;

grouping the cells into a plurality of groups according to the at least two substantially similar destination addresses; and selecting a compression module in response to the number of groups.

36. The method of cell header compression of claim 30, further comprising generating the compression control block using a plurality of compression modules comprising:

a first compression module operable to store a first number of bytes for each cell header of a first group; and a second compression module operable to store a second number of bytes for each cell header of a second group.

37. The method of cell header compression of claim 36, wherein sorting cells according to cell headers comprises:

comparing the cell headers of the cells, identifying a plurality of substantially similar cell headers;

grouping the cells into a plurality of groups according to the substantially similar cell headers; and selecting a compression module in response to the number of transitions.

38. A method of cell header compression, comprising:

receiving a plurality of cells, a cell having a cell header and a payload;

sorting the cells according to the cell headers;

generating a compression control block describing the cell headers and an arrangement of the payloads according to the cell headers by:

determining a number of cells of a subset of the cells, each cell of the subset having a substantially similar cell header;

writing the substantially similar cell header to the compression control block; and writing the number of cells of the subset of cells to the compression control block;

assembling the payloads according to the arrangement; and generating a datagram with the compression control block and the assembled payloads.

39. A system of cell header compression, comprising:

means for receiving a plurality of cells, each cell having a cell header and a payload;

means for sorting the cells according to the cell headers;

means for generating a compression control block describing the cell headers and an arrangement of the payloads according to the cell headers, the compression control block describing a plurality of destination addresses for a number of cells of a plurality of transitions, the destination address for each cell of a transition being substantially similar;

means for assembling the payloads according to the arrangement;

means for generating a datagram with the compression control block and the assembled payloads; and means for transmitting the datagram.

40. A cell header compression system, comprising:

a sorter operable to:
receive a plurality of asynchronous transfer mode cells, each cell comprising a cell header and a payload;
compare the cell headers of the cells;
identify a plurality of substantially similar cell headers; and
group the cells into a plurality of groups according to the substantially similar cell headers;

a plurality of compression modules operable to generate a compression control block describing the cell headers and an arrangement of the payloads according to the cell headers, the sorter further being operable to select a compression module in response to the number of groups, the compression modules comprising;
a first compression module operable to store a first number of bytes for each cell header of a first group; and
a second compression module operable to store a second number of bytes for each cell header of a second group; and a datagram assembler operable to:
assemble the payloads according to the arrangement;
generate a datagram comprising the compression control block and the assembled payloads; and
transmit the datagram.

* * * * *